(12) United States Patent
Ishizaka et al.

(10) Patent No.: US 8,724,157 B2
(45) Date of Patent: May 13, 2014

(54) PRINTING APPARATUS AND PRINTER DRIVER

(71) Applicant: Canon Kabushiki Kaisha, Tokyo (JP)

(72) Inventors: Nobuhiro Ishizaka, Kanagawa (JP); Masahiko Watanabe, Kanagawa (JP); Toru Nakayama, Kanagawa (JP); Takashi Kasahara, Tokyo (JP); Takuji Katsu, Kanagawa (JP); Souhei Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/914,908

(22) Filed: Jun. 11, 2013

(65) Prior Publication Data

US 2013/0271774 A1  Oct. 17, 2013

Related U.S. Application Data

(62) Division of application No. 10/798,309, filed on Mar. 12, 2004.

(51) Int. Cl.
*G06K 15/00* (2006.01)
*G06F 15/00* (2006.01)
*B41J 2/21* (2006.01)

(52) U.S. Cl.
USPC ........... 358/1.16; 358/1.1; 358/1.18; 358/1.8; 347/1; 347/12; 347/13; 347/43

(58) Field of Classification Search
USPC .......... 358/1.1, 1.2, 1.11–1.18, 1.6–1.8, 3.09, 358/502, 515; 347/1–5, 15–19, 171–180, 347/214; 399/111, 112
See application file for complete search history.

(56) References Cited

U.S. PATENT DOCUMENTS

| | | | | |
|---|---|---|---|---|
| 4,492,983 A | * | 1/1985 | Yoshida et al. | 375/240 |
| 4,723,129 A | | 2/1988 | Endo et al. | |
| 4,740,796 A | | 4/1988 | Endo et al. | |
| 5,051,820 A | * | 9/1991 | Sasaki | 358/524 |
| 5,538,352 A | * | 7/1996 | Sugiura | 400/615.2 |
| 5,689,289 A | | 11/1997 | Watanabe et al. | |
| 5,758,042 A | | 5/1998 | Deschuytere | |
| 5,816,714 A | | 10/1998 | Hori | |
| 5,818,474 A | | 10/1998 | Takahashi et al. | |
| 5,907,666 A | | 5/1999 | Yano et al. | |
| 5,953,132 A | * | 9/1999 | Kurosawa et al. | 358/468 |
| 5,975,678 A | | 11/1999 | Kanematsu et al. | |

(Continued)

FOREIGN PATENT DOCUMENTS

| | | |
|---|---|---|
| JP | 11-179979 A | 7/1999 |
| JP | 2001-071573 A | 3/2001 |
| JP | 2002-240370 A | 8/2002 |
| JP | 2002-301839 A | 10/2002 |

*Primary Examiner* — Chad Dickerson
(74) *Attorney, Agent, or Firm* — Fitzpatrick, Cella, Harper & Scinto

(57) ABSTRACT

An object of this invention is to increase the transfer rate of image data from a host computer to a printing apparatus. To achieve this object, a printing apparatus which divides the printing area in the printhead scanning direction into a plurality of regions and prints in each divided region in order to print by scanning the printhead on the printing medium includes a conversion circuit which rearranges image data that is transmitted from the host computer and arranged in a direction perpendicular to the data arrangement of the printhead, into image data in the same horizontal direction as the data arrangement direction of the printhead.

14 Claims, 10 Drawing Sheets

(56) References Cited

U.S. PATENT DOCUMENTS

| | | | |
|---|---|---|---|
| 6,027,197 A | 2/2000 | Kaburagi et al. | |
| 6,097,499 A | 8/2000 | Casey et al. | |
| 6,111,656 A | 8/2000 | Nohata et al. | |
| 6,164,756 A * | 12/2000 | Takahashi et al. | 347/43 |
| 6,328,403 B1 * | 12/2001 | Iwasaki et al. | 347/15 |
| 6,334,809 B1 | 1/2002 | Spang | |
| 6,339,480 B1 | 1/2002 | Yamada et al. | |
| 6,474,782 B1 | 11/2002 | Furukawa | |
| 6,729,709 B2 | 5/2004 | Konno et al. | |
| 7,206,095 B2 | 4/2007 | Nakayama et al. | |
| 7,265,856 B1 * | 9/2007 | Clark et al. | 358/1.15 |
| 7,284,811 B2 * | 10/2007 | Tanaka et al. | 347/15 |
| 2002/0118408 A1 | 8/2002 | Nakayama et al. | |
| 2002/0175961 A1 | 11/2002 | Iwasaki et al. | |
| 2003/0142163 A1 | 7/2003 | Nakayama et al. | |
| 2003/0193535 A1 * | 10/2003 | Nakayama et al. | 347/5 |

* cited by examiner

FIG. 6

| FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|
| FIRST COLOR DATA | FIRST COLOR DATA | FIRST COLOR DATA | FIRST COLOR DATA | FIRST COLOR DATA | FIRST COLOR DATA | FIRST COLOR DATA | FIRST COLOR DATA |
| SECOND COLOR DATA | SECOND COLOR DATA | SECOND COLOR DATA | SECOND COLOR DATA | SECOND COLOR DATA | SECOND COLOR DATA | SECOND COLOR DATA | SECOND COLOR DATA |
| THIRD COLOR DATA | THIRD COLOR DATA | THIRD COLOR DATA | THIRD COLOR DATA | THIRD COLOR DATA | THIRD COLOR DATA | THIRD COLOR DATA | THIRD COLOR DATA |
| FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA |
| FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA |
| SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA |
| SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA |
| EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA |

PRINTING APPARATUS AND PRINTER DRIVER

The present application is a division of U.S. patent application Ser. No. 10/798,309 filed Mar. 12, 2004, the entire disclosure of which is incorporated by reference herein.

FIELD OF THE INVENTION

The present invention relates to a printing apparatus which prints on a printing medium and a printer driver which generates data to be printed by the printing apparatus.

BACKGROUND OF THE INVENTION

There has conventionally been known a printing apparatus which divides the printing area in the printhead scanning direction into a plurality of regions and has a buffer for storing image data of each divided region in order to print by scanning the carriage supporting the printhead on the printing medium. This printing apparatus comprises a write controller which controls, for each color data, write address information of image data of each region on the basis of information for switching the data storage area for each color data and the result of comparison between the remaining storable buffer space and the write address update amount when image data of each divided region is to be stored in the buffer. The printing apparatus further comprises a read controller which controls, for each color data, read address information for reading out image data stored in the buffer, and a printing data generation means which generates printing data of each divided region in accordance with image data read out on the basis of read address information. In the conventional printing apparatus having this arrangement, image data transmitted from a host computer are arranged by the host computer in the same horizontal direction as the data arrangement direction of the printhead.

However, data processing of each bit is difficult for the host computer, and a long time is taken for data processing of each bit in which image data are rearranged in the same horizontal direction as the data arrangement of the printhead. This data processing time inhibits increases in the transfer rate of image data from the printer driver to the printing apparatus and the printing speed.

SUMMARY OF THE INVENTION

The present invention has been made to overcome the conventional drawbacks, and has as its object to increase the transfer rate of image data from a host computer to a printing apparatus.

To achieve the above object, a printing apparatus according to the present invention comprises a function of rearranging image data in the same horizontal direction as the data arrangement of a printhead. This can increase the image data transfer rate of the host computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing the data structure of a print buffer which holds image data;

DETAILED DESCRIPTION OF THE PREFERRED EMBODIMENTS

Preferred embodiments of the present invention will be described below.

First, the outline of an embodiment will be explained.

A printing apparatus according to the embodiment which divides the printing area in the printhead scanning direction into a plurality of regions and has a buffer for storing printing image data of each divided region in order to print by scanning the carriage supporting the printhead on the printing medium comprises a write controller which has an image conversion function of converting image data transmitted from a host computer into the printing image data, and controls, for each color data, write address information of printing image data of each region on the basis of information for switching the data storage area for each color data of the printing image data converted by the image conversion function and the result of comparison between the remaining storable buffer space and the write address update amount.

In the printing apparatus according to the embodiment, the image conversion function has a function of rearranging image data arranged in a direction perpendicular to the data arrangement of the printhead into printing image data in the same horizontal direction as the data arrangement direction of the printhead.

A printing apparatus according to the embodiment which divides the printing area in the printhead scanning direction into a plurality of regions and prints in each divided region in order to print by scanning the printhead on the printing medium is characterized by comprising a conversion means which rearranges image data that is transmitted from a host computer and arranged in a direction perpendicular to the data arrangement of the printhead, into image data in the same horizontal direction as the data arrangement direction of the printhead.

An embodiment in which the present invention is applied to an inkjet printing apparatus will be described below.

Figure 1:
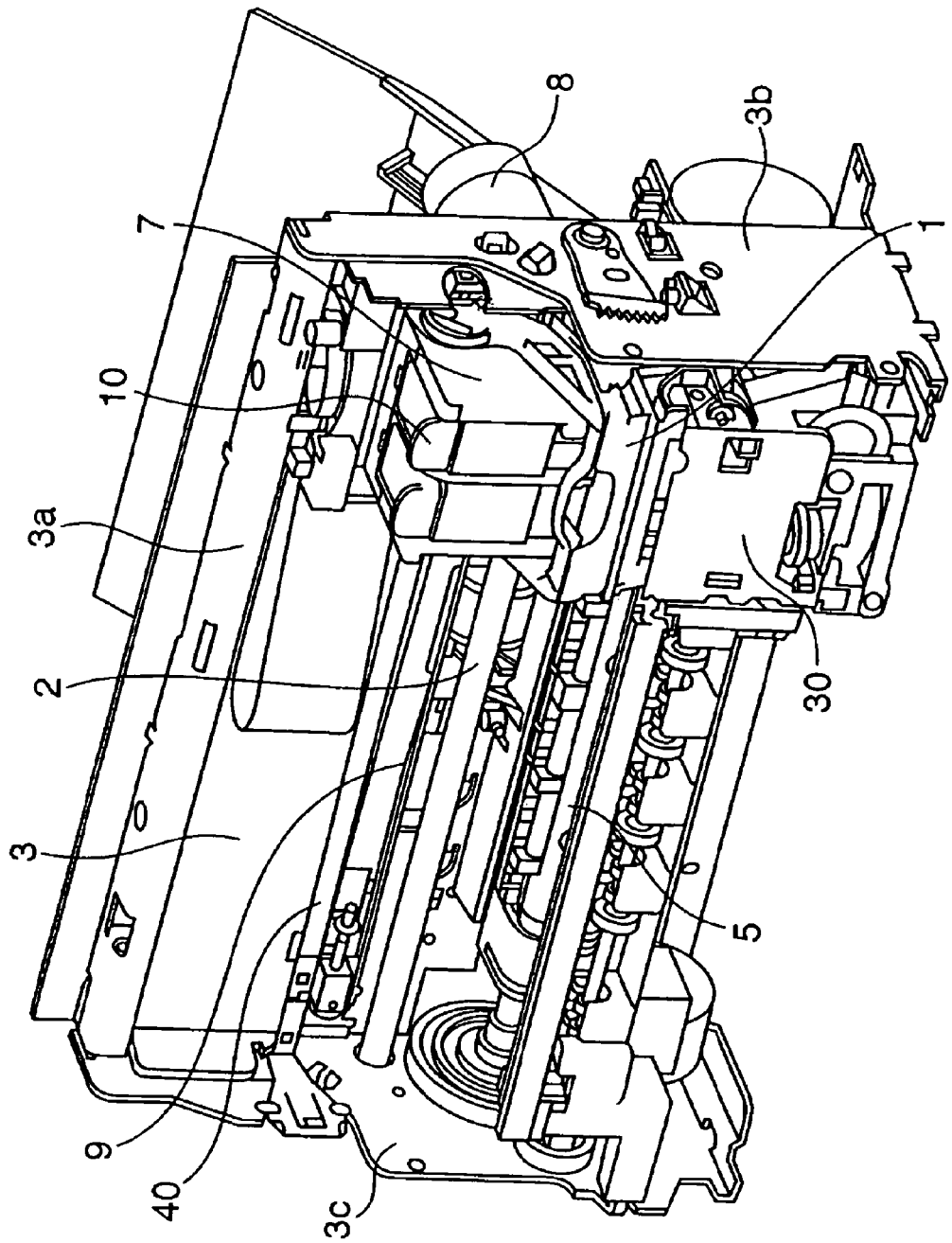
FIG. 1 is a perspective view showing an inkjet printing apparatus according to an embodiment of the present invention.

FIG. 1 is a perspective view showing the inkjet printing apparatus according to the embodiment.

In FIG. 1, a carriage 1 supports a printhead (not shown) and a cartridge 10, and can travel along a guide shaft 2. In the embodiment, the printhead is an inkjet printhead.

A printing sheet is fed into the apparatus main body by a paper feed roller (not shown), pinched between a paper supply roller 5, a pinch roller (not shown), and a paper press plate (not shown), and conveyed to the front surface of the printhead, thereby printing.

The ink cartridge 10 includes a color ink cartridge which stores three, yellow, magenta, and cyan inks and a Bk ink cartridge. These two ink cartridges are separately inserted into a cartridge guide 7 and connected to the printhead.

<First Embodiment>

Figure 2:
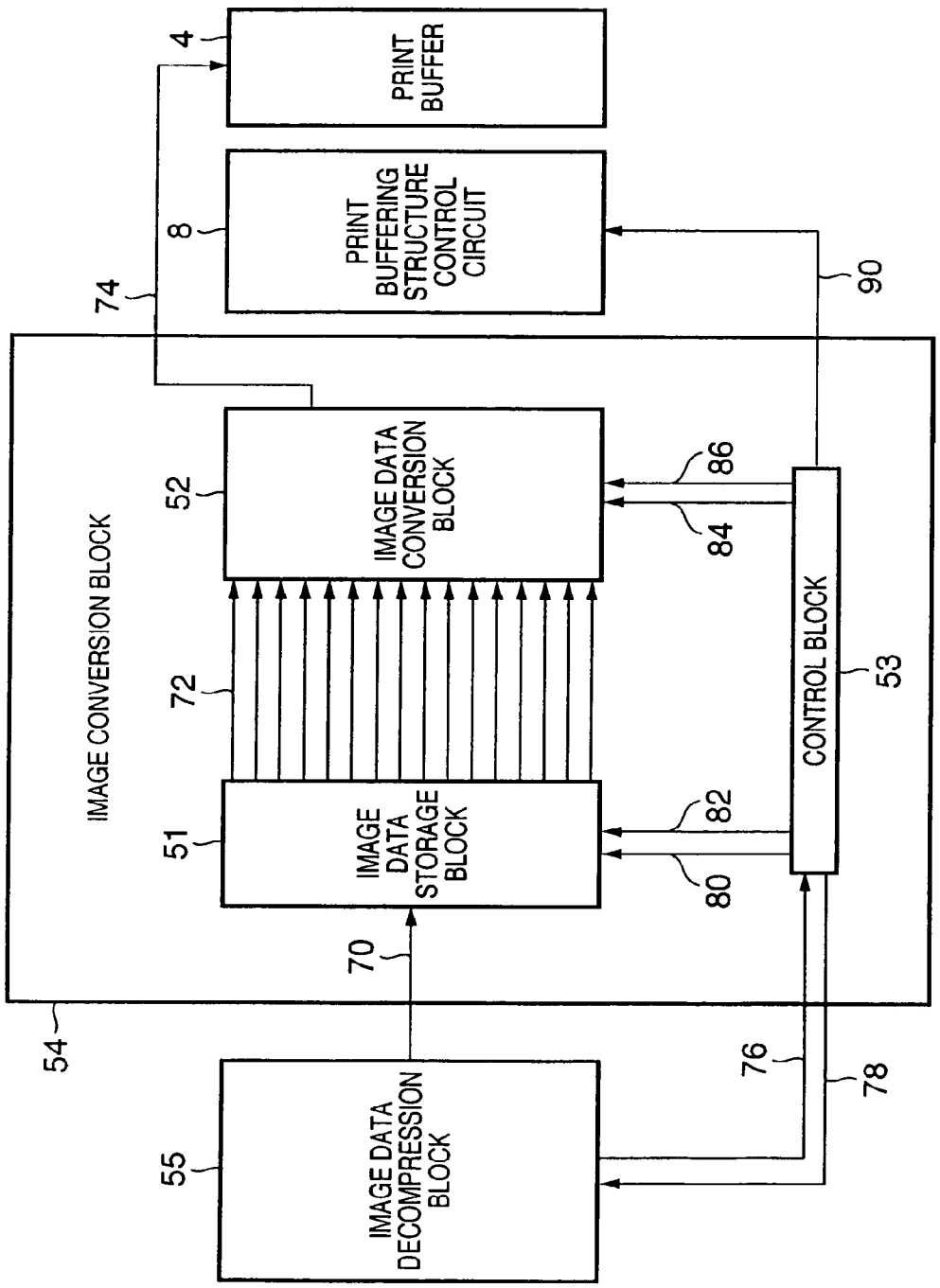
FIG. 2 is a block diagram showing an image conversion block according to the first embodiment.

FIG. 2 is a block diagram showing an image conversion block according to the first embodiment.

In FIG. 2, reference numeral 51 denotes an image data storage block; 52, an image data conversion block; and 53, a control block for controlling the operations of the image data storage block 51 and image data conversion block 52. The blocks 51 to 53 are combined into an image conversion block 54. Reference numeral 55 denotes an image data decompression block; 8, a print buffering structure control circuit; and 4, a print buffer. A color change signal (S541 in FIG. 4) and decompression end signal (S542 in FIG. 4) are input from the image data decompression block 55. The color change signal enables determination of the color of image data during processing. The decompression end signal allows determining that no input data exists. The color change signal is output when the decompression block 55 recognizes a color change code in image data stored in the reception buffer.

Figure 4:
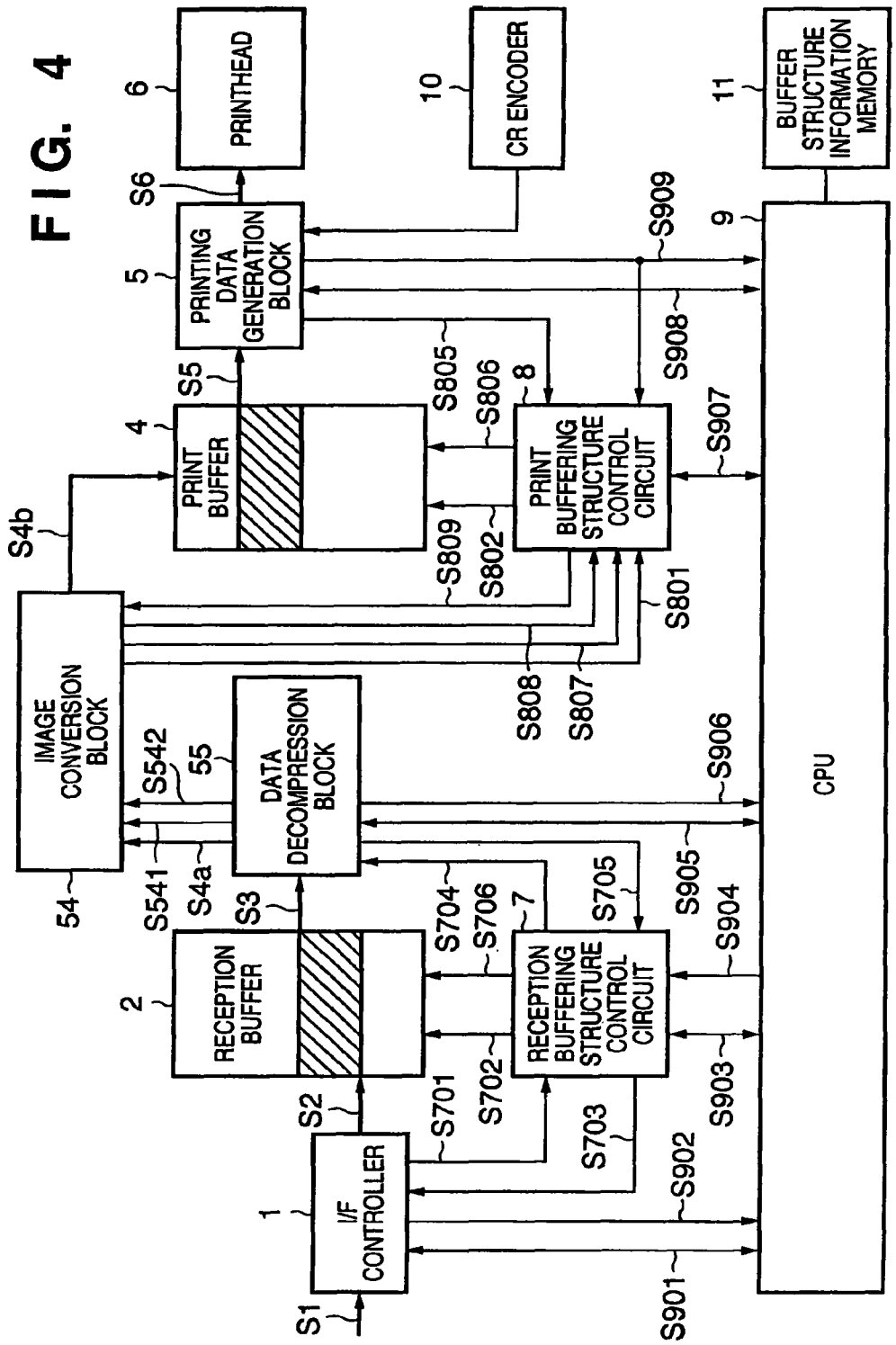
FIG. 4 is a block diagram for explaining the printing controller of the inkjet printing apparatus according to the embodiment of the present invention.

The image conversion block 54 outputs the color change signal (S807 in FIG. 4) and decompression end signal (S808 in FIG. 4) to the print buffering structure control circuit (see 8 in FIG. 4).

A buffer-full signal (S809 in FIG. 4) is input from the print buffering structure control circuit (see 8 in FIG. 4) to recognize that the print buffer 4 becomes full.

Reference numeral 70 denotes input image data; 72, image data; 74, converted image data; 76, a write request signal; 78, a write permission signal; 80, a write start signal; 82, an output start signal; 84, a write start signal; 86, an output start signal; and 90, a write request signal.

The inkjet printing apparatus according to the first embodiment is connected to a host computer, receives image data from the host computer, and prints. In order to print by scanning the carriage supporting the printhead on a printing medium, the printing apparatus according to the first embodiment divides the printing area in the printhead scanning direction into a plurality of regions, and prints an image in each divided region. In this case, the host computer does not rearrange image data in the same horizontal direction as the data arrangement direction of the printhead by data processing of each bit. Instead, in the inkjet printing apparatus according to the first embodiment, image data are rearranged by the image data conversion block 52 or an image data conversion block 103 on the printing apparatus side. This can increase the transfer rate of image data from the host computer to the printing apparatus and the printing speed.

Each block in FIG. 2 will be hereinafter described in more detail.

<Image Data Storage Block>

The image data storage block 51 receives and stores the input image data 70 in accordance with the write start signal 80 from the control block 53. The image data storage block 51 outputs all the image data 72 at once to the image data conversion block 52 in accordance with the output start signal 82 from the control block 53.

<Image Data Conversion Block>

The image data conversion block 52 receives and stores all the image data 72 in accordance with the write start signal 84 from the control block 53. The image data conversion block 52 converts an image and outputs the converted image data 74 to the print buffer 4 in accordance with the output start signal 86 from the control block 53.

<Data Line>

The input image data 70 is, for example, 16-bit data. One line for the image data 72 is, e.g., a 16-bit data line, and 16 data each of 16 bits are parallel-transferred from the image data storage block 51 to the image data conversion block 52. The converted image data 74 is, for example, 16-bit data.

<Image Data Decompression Block>

Figure 8:
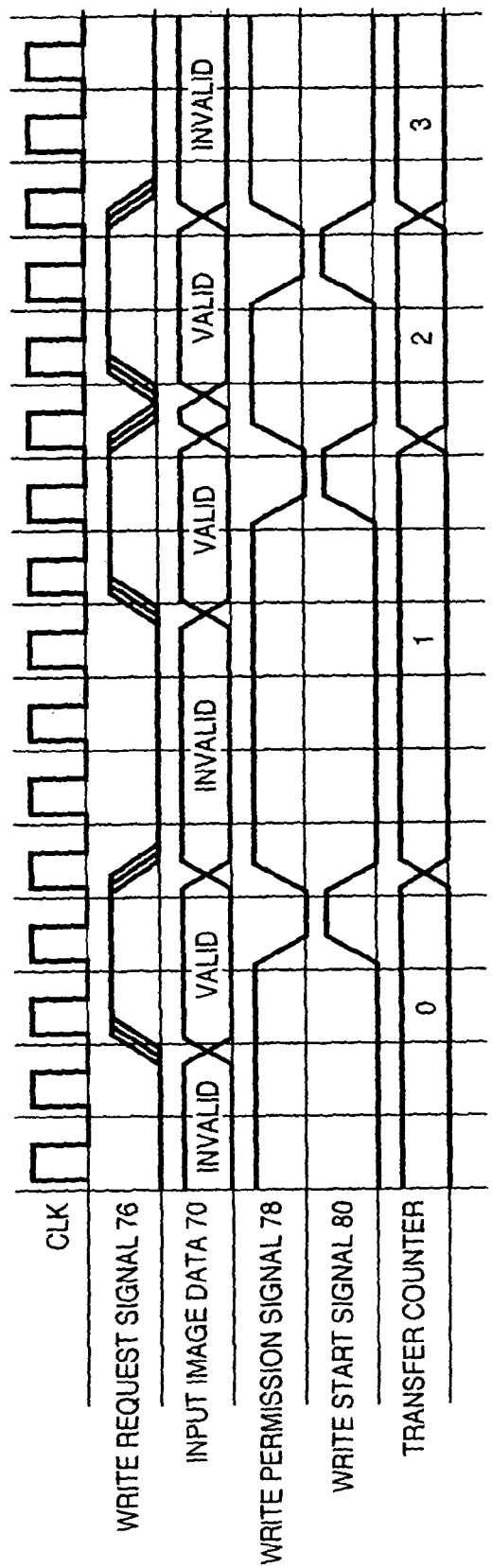
FIG. 8 is a timing chart for explaining the timings of signals output from a control block.

Referring to FIG. 8, the write request signal 76 is output at the same time as the input image data 70, and the write permission signal 78 changes in correspondence with the write request signal 76. When the write start signal 80 is output together with the write permission signal 78, the input image data 70 is stored in the image data storage block 51.

When the next write request signal 76 is output, the image data decompression block 55 outputs the next input image data 70. As for transfer of the input image data 70, one sequence transfers data a predetermined number of times (e.g., 16 times). Accordingly, the input image data 70 (16-bit data) are sequentially transferred from the image data decompression block 55 to the image data storage block 51.

Note that, the color change signal (S541 in FIG. 4) is outputted after the transfer sequence of the input image data 70 has been completed, and the decompression end signal (S542 in FIG. 4) is outputted after the color change signal (S541 in FIG. 4) has been outputted.

For example, referring to FIG. 6 in the case that data for eight colors are transferred, a color change code is outputted after data for one color has been outputted. In other words, eight color change codes are outputted. After that, the decompression end signal is outputted. As for a second block, eight color change signals are outputted and after that the decompression end signal is outputted similarly to the first block.

As described above, the decompression end signals whose number corresponds to a number of data blocks are outputted in one main scanning operation. For example, eight decompression end signals are outputted in the case that data transfer operation for eight blocks is performed for one main scanning operation.

<Print Buffering Structure Control Circuit 8/Print Buffer 4>

The print buffering structure control circuit 8 and print buffer 4 will be described in detail later.

<Control Block>

(To image Data Decompression Block 55)

The transfer operation of the input image data 70 is performed such that a predetermined number of times (e.g. 16 times) are as one unit.

The control block 53 comprises a transfer counter which counts the number of transfer operations. The value of the transfer counter is counted up every time transfer is performed.

If the color change signal (S541 in FIG. 4) is input before a predetermined number of transfer operations, the image conversion block 54 sets "0" data in the image data storage block 51 instead of the transfer of the input image data. For example, when 16-bit data are transferred 10 times and then the color change signal is input, the remaining six "0" data are set. After that, all data that have been stored in the image data storage block 51 and the image data conversion block 54 are outputted to the print buffer. Further, the color change signal (S541 in FIG. 4) is outputted to the print buffering structure control circuit 8.

If the color change signal (S541 in FIG. 4) is input after a predetermined number of transfer operations, all data that have been stored in the image data storage block 51 and the image data conversion block 54 are outputted to the print buffer. After that, the color change signal (S541 in FIG. 4) is outputted to the print buffering structure control circuit 8.

After the decompression end signal (S542) is input, the value of the transfer counter is cleared to 0. The next transfer sequence is then prepared. In the next transfer sequence, data are so stored as to be overwritten on data transferred in the previous sequence.

(To Image Data Storage Block 51)

The control block 53 receives the write request signal 76 from the image data decompression block 55, and if the image data storage block 51 is in the write enable state, outputs the write permission signal 78 to the image data decompression block 55.

The control block 53 can obtain the state of the image data storage block 51 by referring to the above-mentioned transfer counter value. For example, when no image is input even once, the counter exhibits 0. Every time one data is received, the counter is counted up by one. When the counter reaches a preset value (e.g., the counter value becomes 16), the image data storage block 51 changes to the write disable state. The counter value is set to 0 after the image data 72 is written in the image data conversion block 52.

The control block 53 receives the write request signal 76 from the image data decompression block 55, and if the image data storage block 51 is in the write enable state, outputs the write start signal 80 to the image data storage block 51. In the first embodiment, the write permission signal 78 and write start signal 80 are simultaneously output. Alternatively, the write start signal 80 may be output prior to the write permission signal 78.

When the input image data 70 is input and stored in the image data storage block 51, the control block 53 stops outputting the write start signal 80. As the input method, for example, 16-bit single input is performed 16 times. Alternatively, 16-bit burst input (successive 16 inputs) may be done.

After the input image data 70 are received from the image data decompression block 55 a preset number of times, for example 16 times, the control block 53 outputs the output start signal 82 to the image data storage block 51. In this state, the image data storage block 51 changes to the write disable state.

(To Image Data Conversion Block 52)

When the image data storage block 51 receives inputs a preset number of times, the control block 53 outputs the output start signal 82 to the image data storage block. The control block 53 comprises another counter "output counter", and can obtain the state of the image data conversion block 52 from this counter value.

Assume, for example, when the image data conversion block 52 receives the image data 72, a preset number (e.g., 16) is set in the counter. The image data conversion block 52 transfers data to the print buffer 4 a preset number of times, and then the output counter value changes to 0. This state is shown in FIG. 9.

Figure 9:
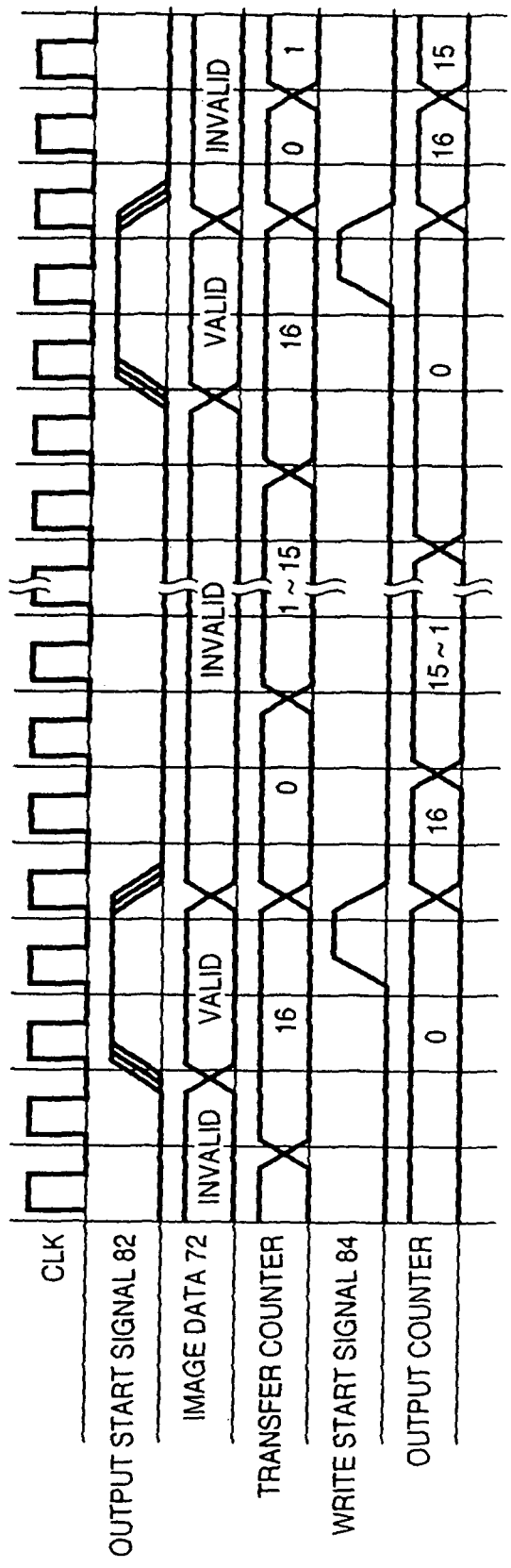
FIG. 9 is a timing chart for explaining the timings of signals output from the control block.

As shown in FIG. 9, the image data conversion block 52 changes to the storable state when the output counter value becomes 0. The control block 53 outputs the write start signal 84 in a state in which the output counter value is 0 and the value of the output start signal 82 is at high level (H). In response to output of the write start signal 84, the image data storage block 51 transfers the image data 72 to the image data conversion block 52.

After the image data 72 is input and stored in the image data conversion block 52, the control block 53 stops outputting the output start signal 82, and the image data storage block 51 returns to the write enable state. The same processing is repeated between the image data decompression block 55, the image data storage block 51, the image data conversion block 52, and the control block 53.

(To Image Data Conversion Block)

Input of the image data 72 to the image data conversion block 52 is, for example, 16 data each of 16 bits that are simultaneously parallel-transferred and simultaneously written.

After all the image data 72 are input and stored in the image data conversion block 52, the control block 53 simultaneously outputs the write request signal 90 to the print buffering structure control circuit 8 and the output start signal 86 to the image data conversion block 52 in the first embodiment. Alternatively, the output start signal 86 may be output prior to the write request signal 90. In this state, the image data conversion block 52 changes to the write disable state.

In order to output the next data from the image data conversion block 52, the control block 53 temporarily stops outputting the output start signal 86 and write request signal 90. The control block 53 newly outputs the output start signal 86 to the image data conversion block 52 and the write request signal 90 to the print buffering structure control circuit 8.

The output method is, for example, a 16-bit single output that is performed 16 times. As one transfer sequence, 16 transfer operations are executed. In place of this method, 16-bit burst output (successive 16 outputs) may be done as the transfer method.

After all the converted image data 74 are output to the print buffer 4, the control block 53 stops outputting the write request signal 90 and output start signal 86, and the image data conversion block 52 returns to the write enable state. The same processing is repeated between the print buffering structure control circuit 8, the print buffer 4, the image data conversion block 52, and the control block 53. If a buffer-full signal (S809 in FIG. 4) is received, the control block 53 stops outputting the output start signal 86 and write request signal 90. After the buffer-full signal is disabled (changes from H to L), the control block 53 outputs the output start signal 86 and write request signal 90.

<Modification to First Embodiment>

Figure 10:
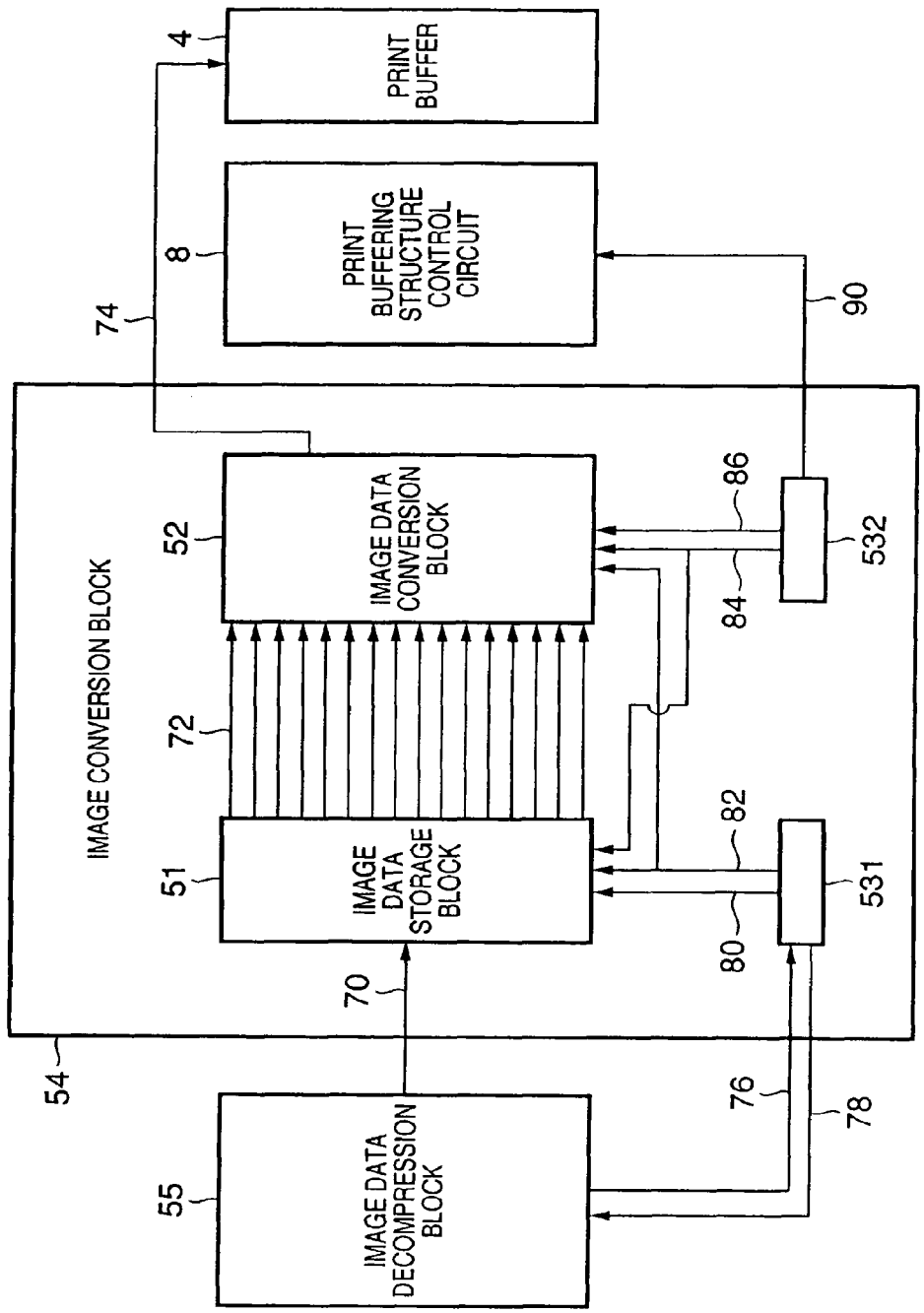
FIG. 10 is a block diagram showing an image conversion block according to a modification to the first embodiment.

FIG. 10 shows a modification to the first embodiment. As shown in FIG. 10, the image conversion block 54 may comprise two control blocks. In this case, a control block 531 also outputs the output start signal 82 to the image data conversion block 52. A control block 532 also outputs the write start signal 84 to the image data storage block 51.

<Second Embodiment>

Figure 3:
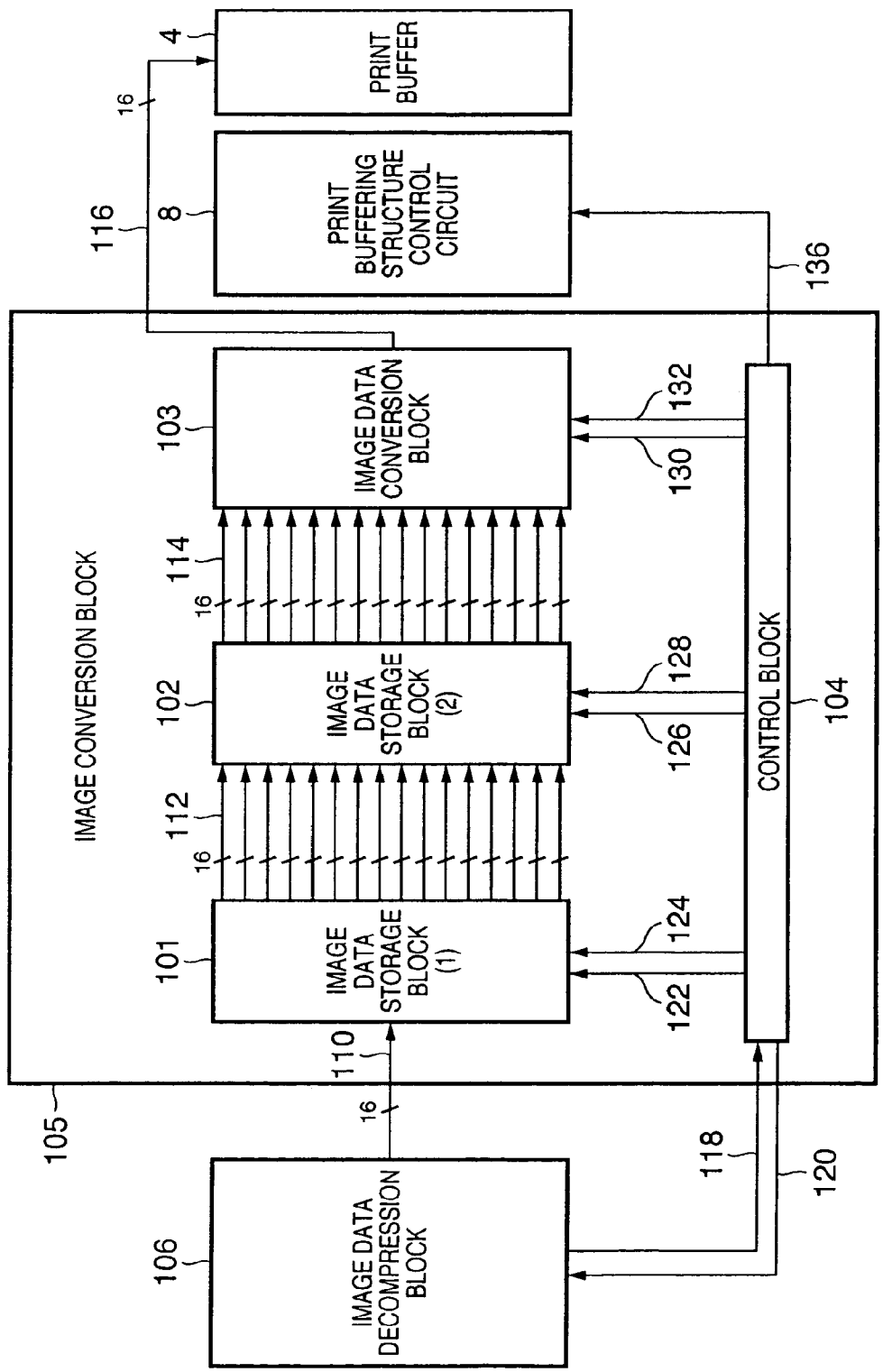
FIG. 3 is a block diagram showing an image conversion block according to the second embodiment.

FIG. 3 is a block diagram showing an image conversion block according to the second embodiment. Reference numeral 101 denotes an image data storage block (1); 102, an image data storage block (2); 103, an image data conversion block; and 104, a control block for controlling the operations of the image data storage block (1) 101, image data storage block (2) 102, and image data conversion block 103. The blocks 101 to 104 are combined into an image conversion block 105. Reference numeral 106 denotes an image data decompression block; and 107, a DMA (Direct Memory Access) block.

Similar to the first embodiment, a color change signal (S541 in FIG. 4) and decompression end signal (S542 in FIG. 4) are input from the image data decompression block 106. The color change signal (S807 in FIG. 4) and decompression end signal (S808 in FIG. 4) are output to a print buffering structure control circuit (see 8 in FIG. 4). A buffer-full signal (S809 in FIG. 4) is input from the print buffering structure control circuit (see 8 in FIG. 4) to recognize that a print buffer 4 becomes full. These operations are the same as those in the first embodiment, and a description thereof will be omitted.

Reference numeral 110 denotes input image data; 112, image data (1); 114, image data (2); 116, converted image data; 118, a write request signal; 120, a write permission signal; 122, a write start signal; 124, an output start signal; 126, a write start signal; 128, an output start signal; 130, a write start signal; 132, an output start signal; and 136, a write request signal.

Each block in FIG. 3 will be described in more detail.

<Image Data Storage Block>

The image data storage block (1) 101 receives and stores the input image data 110 in accordance with the write start signal 122 from the control block 104. The image data storage block (1) 101 outputs all the image data (1) 112 at once to the image data storage block (2) 102 in accordance with the output start signal 124 from the control block 104.

The image data storage block (2) 102 receives and stores the input image data (1) 112 in accordance with the write start signal 126 from the control block 104. The image data storage block (2) 102 outputs all the image data (2) 114 at once to the image data conversion block 103 in accordance with the output start signal 128 from the control block 104.

<Image Data Conversion Block>

The image data conversion block 103 receives all the image data (2) 114 and stores them in the image data storage block (2) in accordance with the write start signal 130 from the control block 104. The image data conversion block 103 converts an image and outputs the converted image data 116 to the print buffer 4 in accordance with the output start signal 132 from the control block 104.

<Data Line>

The input image data (1) 110 is, for example, 16-bit data. One line for the image data (1) 112 is, for example, a 16-bit data line, and 16 data each of 16 bits are parallel-transferred at once from the image data storage block (1) 101 to the image data storage block (2) 102.

One line for the image data (2) 114 is, for example, a 16-bit data line, and 16 data each of 16 bits are parallel-transferred from the image data storage block (2) to the image data conversion block 103. The converted image data 116 is, for example, 16-bit data.

<Image Data Decompression Block>

Control of the write request signal 118, input image data 110, write permission signal 120, and write start signal 122 is the same as that in the first embodiment, and a description thereof will be omitted.

<Print Buffering Structure Control Circuit/Print Buffer>

The print buffering structure control circuit 8 and print buffer 4 will be described in detail later.

<Control Block>

The operation of the control block 104 is basically the same as that of the controller described in the first embodiment.

(To Image Data Storage Block (1) 101)

The control block 104 receives the write request signal 118 from the image data decompression block 106, and if the image data storage block (2) 102 is in the write enable state, outputs the write permission signal 120 to the image data decompression block 106.

Also, the control block 104 receives the write request signal 118 from the image data decompression block 106, and if the image data storage block (1) 101 is in the write enable state, outputs the write start signal 122 to the image data storage block (1) 101.

The write permission signal 120 and write start signal 122 are simultaneously output, or the write start signal 122 is output prior to the write permission signal 120.

When the input image data 110 is input and stored in the image data storage block (1) 101, the control block 104 stops outputting the write start signal 122.

The input method is, for example, a 16-bit single input that is performed 16 times. Alternatively, 16-bit burst input (successive 16 inputs) may be done.

After the input image data 110 are received from the image data decompression block 106 a preset number of times (e.g., 16 times), the control block 104 outputs the output start signal 124 to the image data storage block (1) 101. In this state, the image data storage block (1) 101 changes to the write disable state.

When the image data (1) 112 are input and stored in the image data storage block (2) 102, the control block 104 stops outputting the output start signal 124 and image data (1) 112, and the image data storage block (1) 101 returns to the write enable state.

The same processing is repeated between the image data decompression block 106, the image data storage block (1) 101, the image data storage block (2) 102, and the control block 104.

(To Image Data Storage Block (2) 102)

The control block 104 outputs the write start signal 126 if the image data storage block (1) 101 outputs the image data 110 and output start signal 124 and the image data (1) 112 can receive data.

When all the image data (1) 112 are input and stored in the image data storage block (2) 102, the control block 104 outputs the output start signal 128. In this state, the image data storage block (2) 102 changes to the write disable state.

Input of the image data (1) 112 to the image data storage block (2) 102 is, for example, 16 data each of 16 bits that are simultaneously parallel-transferred and simultaneously written.

Simultaneously when the image data (2) 114 are input and stored in the image data conversion block 103, the control block 104 stops outputting the output start signal 128, and the image data storage block (2) 102 returns to the write enable state.

The same processing is repeated between the image data storage block (1) 101, the image data storage block (2) 102, the image data conversion block 103, and the control block 104.

(To Image Data Conversion Block)

The control block 104 outputs the write start signal 130 if the image data storage block (2) 102 outputs the image data (2) 114 and output start signal 128 and the image data conversion block 103 can receive data.

When all the image data (2) 114 are input and stored in the image data conversion block 103, the control block 104 simultaneously outputs the write request signal 136 to the print buffering structure control circuit 8 and the output start signal 132 to the image data conversion block 103, or outputs the output start signal 132 prior to the write request signal 136. In this state, the image data conversion block 103 changes to the write disable state.

Input of the image data (2) 114 to the image data conversion block 103 is, for example, 16 data each of 16 bits that are simultaneously parallel-transferred and simultaneously written.

In order to output the next data from the image data conversion block 103, the control block 104 temporarily stops outputting the output start signal 132 and write request signal 136. The control block 104 newly outputs the output start signal 132 to the image data conversion block 103 and the write request signal 136 to the print buffering structure control circuit 8.

The output method is, for example, a 16-bit single output that is performed 16 times, or 16-bit burst output (successive 16 outputs) that is performed.

After all the converted image data 116 are output to the print buffer 4, the control block 104 stops outputting the output start signal 132, and the image data conversion block 103 returns to the write enable state.

The same processing is repeated between the print buffering structure control circuit 8, the print buffer 4, the image data conversion block 103, and the control block 104.

As described above, the second embodiment adopts the two image data storage blocks, and the image data storage block 102 (2) functions as a buffer.

With this arrangement, for example, when the data output rate of the image data decompression block 106 is higher than the data transfer rate to the print buffer 4, data can be smoothly output without stopping processing of the image data decompression block 106 because the image. data storage block 102 (2) often makes the image data storage block (1) empty.

To the contrary, when the data output rate of the image data decompression block 106 is lower than the data transfer rate to the print buffer 4, data can be smoothly transferred without stopping processing of the print buffering structure control circuit 8 and print buffer 4 because the image data storage block 102 (2) almost always holds data.

<Printing Apparatus Adopting Embodiments>

FIG. 4 is a block diagram showing the printing controller of a printing apparatus using the image conversion block 54 described in the first embodiment of the printing apparatus according to the present invention. In FIG. 4, reference numeral 1 denotes an interface controller which receives data transferred from a host computer (not shown) via an interface signal line S1, extracts data necessary for the operation of the printing apparatus and image data from the received data, and temporarily stores the extracted data. Data extracted by the interface controller 1 is stored in a reception buffer 2 via a signal line S2.

Figure 5A:
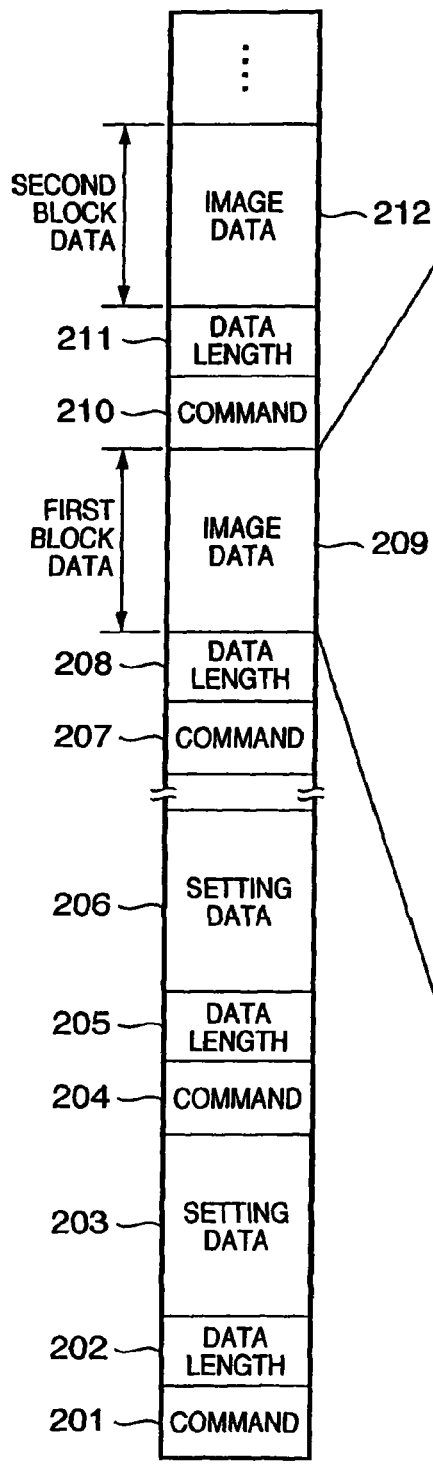
FIGS. 5A and 5B are views showing a data structure when data transferred from a host computer is stored in a reception buffer.
Figure 5B:
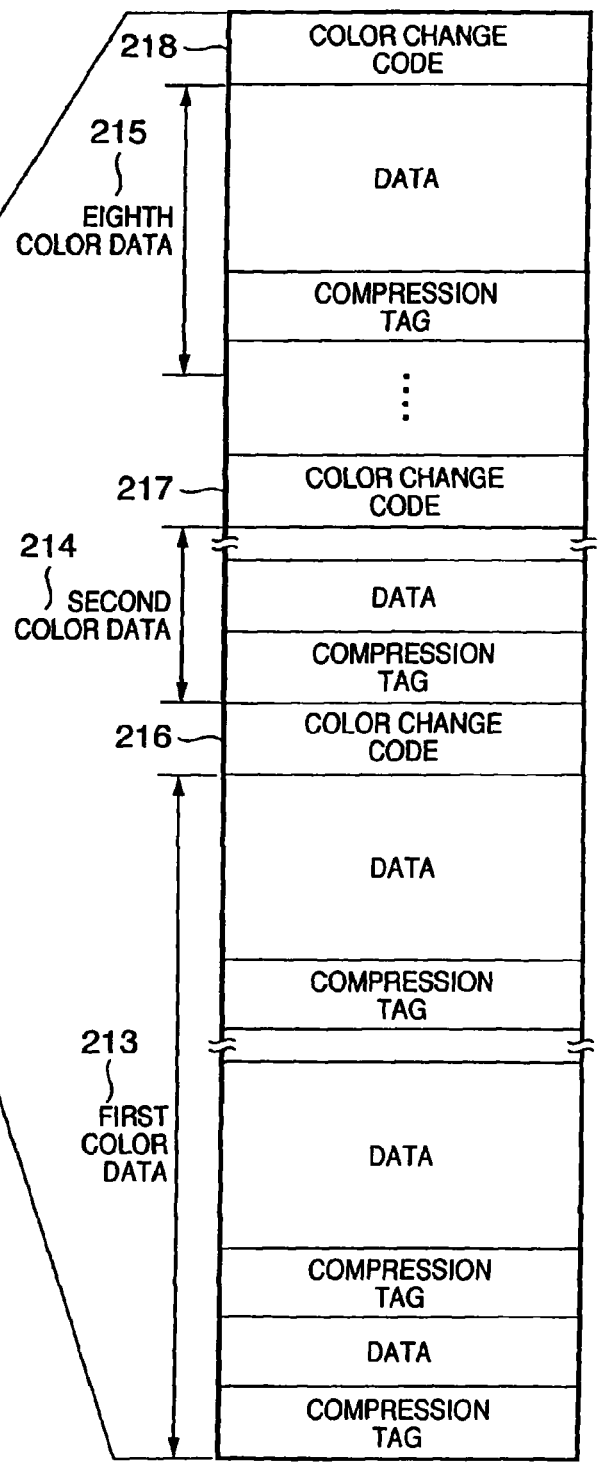

The reception buffer 2 is formed by a storage device such as an SRAM or DRAM, and data stored in the reception buffer has a structure as shown in FIGS. 5A and 5B.

As represented by the data structure of the reception buffer in FIG. 5A, "command" (201), "data length" (202), and "setting data" (203) are sequentially stored from the left. Subsequently, "command" (204), "data length" (205), and "setting data" (206) are stored. This means that data transferred in time series are stored at consecutive addresses in the reception buffer. The setting data 206 is information representing execution of paper feed, setting of the paper feed amount, the number of printheads for use, and the like. The printing apparatus can print only after all pieces of information defined by the setting data are obtained. Subsequent to these data, image data (209 and 212) to be printed are stored in the reception buffer 2.

The image data (209 and 212) are data obtained by dividing, into blocks, a data amount smaller than a data amount necessary for printing by scanning the printhead once on the printing medium. Image data is divided into blocks, and the divided data are sequentially stored as the first block data (209), second block data (212), . . .

FIG. 5B is a view showing in detail the data structure of image data divided into blocks. As shown in FIG. 5B, a plurality of color data (213 to 215) are sequentially stored as compressed data. The color data are separated by "color change codes" (216, 217, and 218).

For example, assuming color data of four, cyan, yellow, magenta, and black colors, a printhead having two nozzle arrays each of 64 nozzles in the longitudinal direction for each color is adopted. Since data of each nozzle array forms one color data, (compressed color data of two nozzle arrays)× (four colors), that is, the first to eighth colors are stored as image data in one block data. The nozzles of each nozzle array are arranged in the printing medium convey direction. For example, data of the first and second colors are cyan data, data of the third and fourth colors are magenta data, data of the fifth and sixth colors are yellow data, and data of the seventh and eighth colors are black data. The compressed data is decompressed to obtain raster data. When no data to be printed is obtained by each block, for example, no magenta data exists, no data of the third and fourth colors exist. However, a color change code is always contained in image data regardless of the presence/absence of data.

FIG. 6 is a view showing the data structure of the print buffer which holds image data. For example, when the printing apparatus prints by a length of about eight inches at maximum in the scanning direction by one scanning and one block data corresponds to a size enough to print by about one inch in the scanning direction, an image of one scanning is completed by printing image data of a total of eight blocks. The first to eighth blocks are arranged in the printhead scanning direction, and each block data contains the first to eighth color data. As for each color data stored in each block, the longitudinal length in FIG. 6 corresponds to the number of nozzles of the printhead. For example, one block can store (1" raster data)×(64 rasters).

Referring back to FIG. 4, each control block will be explained. Of data stored in the reception buffer 2, "command", "data length", and "setting data" serving as setting values for controlling the printing apparatus are read out from the interface controller 1 by a CPU 9 via a signal line S902, and set in control circuits (7 and 8) in FIG. 4 (S903 and S907). The CPU 9 interprets the readout data (data corresponding to 201 to 208 in FIG. 5A), and centralizes the overall printing control of the printing apparatus in accordance with the result. As for image data processing, the CPU 9 activates a data decompression block 55 and causes it to execute processing.

As shown in FIG. 5B; the data decompression block 55 reads out three data "compression TAG", "data", and "color change code" from the reception buffer 2, and executes data storage control on the basis of these data. The embodiment employs PackBits compression as a data compression/decompression method. When the compression TAG takes an 8-bit value of 00h to 7Fh, data are processed on the assumption that one to 128 non-contiguous data exist in the data area. When the compression TAG takes an 8-bit value of FFh to 81h, the next 1-byte data is decompressed into one to 128 contiguous data. If 80h is read out from the compression TAG, data is processed as a color change code. Decompressed data is sent to the image conversion block 54 via a signal line S4a. The data undergoes HV conversion by the image conversion block 54, and the HV-converted data is stored in the print buffer 4 via a signal line S4b.

The print buffer 4 stores the decompressed image data in the data structure shown in FIG. 6. The first data of the first color data of the first block is written at the start address of the print buffer 4. Subsequent data are sequentially written by incrementing the address one by one. An area capable of storing one color data at the address of the print buffer is determined by setting data first loaded by the CPU 9, and data larger than the value of the setting data cannot be written. In compressing image data, the data size is limited in accordance with the setting data. Data after detecting a color change code are sequentially written from the start address of the second color data. Control of address data is executed by the print buffering structure control circuit 8 (to be described later).

Write is repeated from the first color data to the eighth color data. If a color change code is detected after the end of writing the eighth color data, write of all the data of the first block is completed. The data decompression block 55 ends data rasterization operation, notifies the CPU 9 by an interrupt (INT3) of the completion of rasterizing data of one block, and waits for the start of next data rasterization from the CPU 9.

When image data of a plurality of blocks are stored in the print buffer 4, the CPU 9 operates a scanning motor (not shown) in order to start printing operation. While a printhead 6 scans, image data is transferred in synchronism with a carriage encoder (CR encoder) 10 and printed to complete an image on a paper surface (printing medium). After the printhead 6 scans in the main scanning direction, a convey means conveys the printing medium in the sub-scanning direction. Scanning of the printhead and conveyance of the printing medium are repeated to print an image of one page.

A printing data generation block 5 reads out each block structure of image data from the print buffer 4 via a signal line S5 at a timing synchronized with the CR encoder 10 in accordance with the value designated by the CPU 9. While the printing data generation block 5 converts the data structure into one printable by the printhead 6, the block 5 outputs the converted data structure to a signal line S6. The printing data generation block 5 holds information on the block width (representing the block length) in the print buffer and information on the height (to be referred to as "the number of rasters" of color data) of each color of the block (these pieces of information will be described later).

The readout data area of the print buffer 4 is cleared to 0 in order to store the next printing data.

<Write/Read Control of Reception Buffer>

As described above, the interface controller 1 writes data in the reception buffer 2, and the data decompression block 55 reads out only image data from the reception buffer 2. The write address and read address are controlled by the reception buffering structure control circuit 7. The reception buffering structure control circuit 7 manages the start address, final address, write address, and read address of the reception buffer 2.

Every time the reception buffering structure control circuit 7 receives a write request signal (S701) from the interface controller 1, the circuit 7 increments the address by one, and outputs the incremented address as write address information to the reception buffer 2 (signal line S702). When the write address reaches the final address of the reception buffer 2, the reception buffering structure control circuit 7 performs control of returning the write address to the start address of the reception buffer 2.

When the write address reaches (coincides with) the read address, the reception buffering structure control circuit 7 notifies the interface controller 1 via a signal line S703 that the reception buffer 2 becomes full of data and no next data can be written.

At the same time, the reception buffering structure control circuit 7 also notifies the CPU 9 by an interrupt signal via a signal line S904 that no data can be written in the reception buffer 2. The structure of the reception buffer 2 can be set by writing it in an internal register by the CPU 9 using the bus of a signal line S903.

The read address is incremented by one and output to the reception buffer 2 via a signal line S706 when the CPU 9 directly reads out data from the reception buffer 2 via a data read register arranged in the reception buffering structure control circuit 7, or when the data decompression block 55 issues a request via a data read request signal line S705.

When the read address reaches the final address, the reception buffering structure control circuit 7 performs control of returning the read address to the start address of the reception buffer 2. Also when the read address reaches (coincides with) the write address, no data exists in the reception buffer, and the reception buffering structure control circuit 7 notifies the data decompression block via the signal line S704 that no next data can be read out. At the same time, the reception buffering structure control circuit 7 also notifies the CPU 9 by the interrupt signal line of the signal line S904 that no data to be read out exists in the reception buffer 2.

The processing contents of data write/read control to the reception buffer 2 have been described. Processing contents for writing, in the print buffer, data which is read out from the reception buffer 2 and rasterized, or reading out data from the print buffer will be explained, <Write/Read Control of Print Buffer>

The image conversion block 54 writes image data in the print buffer 4, and the printing data generation block 5 reads out the written image data. At this time, the write address and read address are controlled by the print buffering structure control circuit 8.

The print buffering structure control circuit 8 manages the start address, final address, write address, and read address of the print buffer.

Every time the print buffering structure control circuit 8 receives a write request signal (S801) from the image conversion block 54, the circuit 8 increments the address by one, and outputs the incremented address as write address information to the print buffer 4 (signal line S802). When the write address reaches the final address of the print buffer 4, the print buffering structure control circuit 8 performs control of returning the write address to the start address of the print buffer 4.

When the write address reaches (coincides with) the read address, the print buffering structure control circuit 8 notifies the image conversion block 54 via a signal line S809 that the print buffer 4 becomes full of image data and no next image data can be written.

When the data decompression block 55 loads a color change code from the reception buffer 2, the data decompression block 55 notifies the image conversion block 54 of a message to this effect via a signal line S541. The image conversion block outputs data to the print buffering structure control circuit via a signal line S807. The print buffering structure control circuit 8 prepares to output from a signal line S802 the start address at which the next color data is to be stored. The structure of the print buffer 4 can be set by writing it in an internal register by the CPU 9 using the bus of a signal line S907.

The read address is incremented by one and output to the print buffer 4 via a signal line S806 when the printing data generation block 5 issues a request via a data read request signal line S805.

When the read address reaches the final address, the print buffering structure control circuit 8 performs control of returning the read address to the start address of the print buffer 4.

The printing data generation block 5 sets the data structure of a currently read image data block in the internal register of the printing data generation block 5 from the CPU 9 via the bus of a signal line S908. After all image data in the set image data block structure are read out, the printing data generation block 5 outputs an end signal S909 as an interrupt signal to the CPU 9. At this time, if the next image data block has already been rasterized in the print buffer 4, the image data block structure is written in the register.

The print buffer 4 controls data write of the image data block, and does not activate the printing data generation block for an unwritten image data block. For this reason, the read address of the print buffer does not exceed the write address. Reference numeral 11 denotes a buffer structure information memory. The buffer structure information memory 11 is a work memory (work RAM) for controlling the print buffer, and is an area which temporarily stores information on the print buffer structure (to be described later).

The outline of the printing data flow in the printing controller has been described. The image conversion block may be the image conversion block 105 described in the second embodiment.

Figure 7:
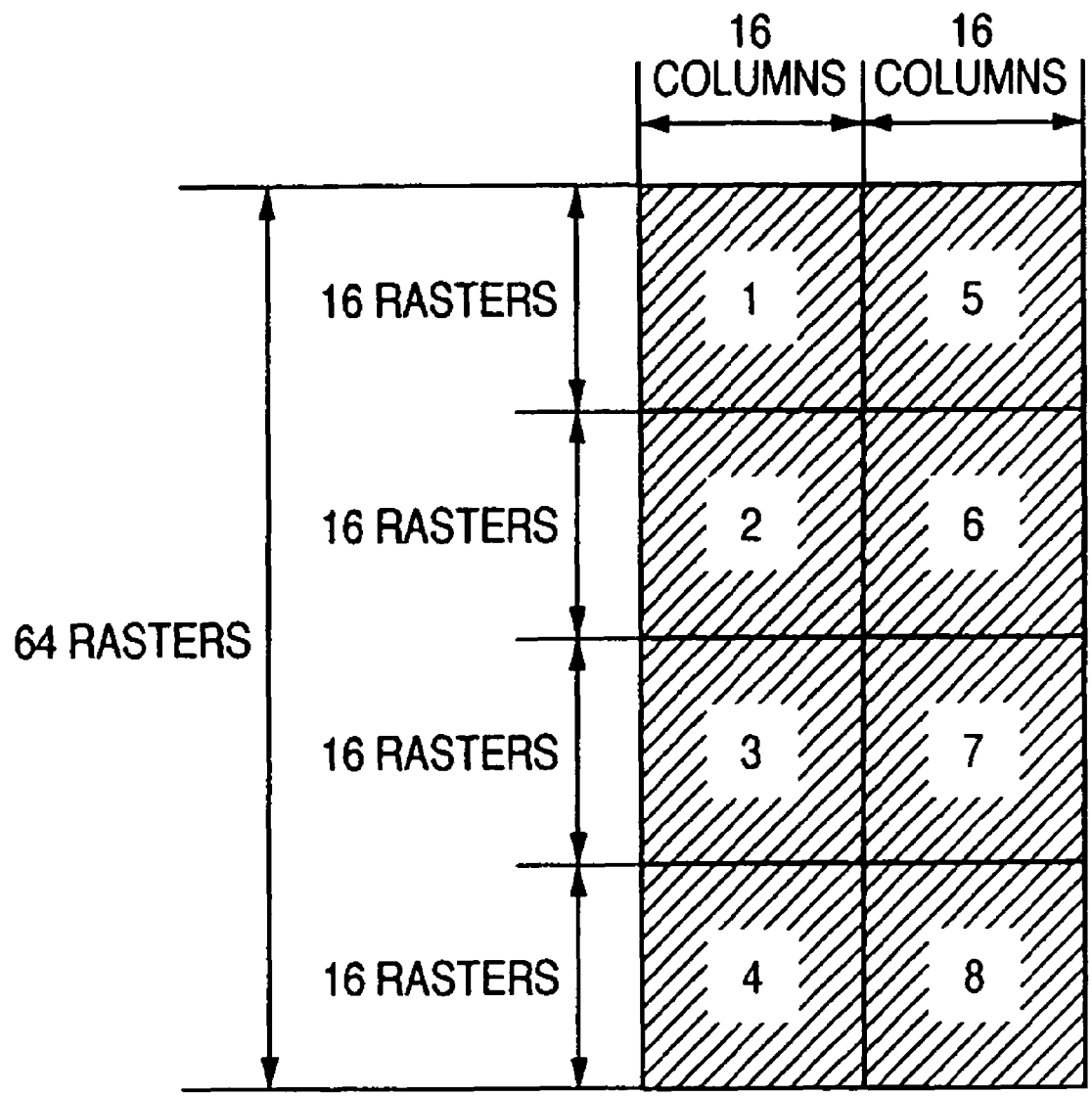
FIG. 7 is a view for explaining image data conversion.

FIG. 7 is a view showing image data conversion. One image conversion unit includes 16 rasters in the vertical direction and 16 columns in the lateral direction. For descriptive convenience, when the block size of one color of the first block has 64 rasters in the longitudinal direction and 32 columns in the lateral direction, conversion processing is executed in the numerical order shown in FIG. 7, achieving conversion of 64 rasters in the longitudinal direction and 32 columns in the lateral direction. In this manner, the memory area for each color in the first to eighth blocks is divided into subblock areas each corresponding to the image conversion unit, and then converted data is stored.

For example, after the first color data of the first block shown in FIG. 6 is converted, the second to eighth color data are sequentially converted for the first block. After all the color data of the first block are converted, the second block is converted. The blocks are converted up to the eighth block.

The number of rasters in the longitudinal direction subjected to conversion corresponds to the number of nozzles which constitute the nozzle array of the printhead. In this example, one nozzle array is formed by 64 nozzles, but the number of nozzles may be another value (e.g., 128 or 256). The number of columns in one block is 16, but may be another value.

In the embodiment (FIG. 6), the number of blocks divided in the scanning direction is 8, but may be another value.

As described above, according to the first and second embodiments, the inkjet printing apparatus is given a function of rearranging image data in the same horizontal direction as the data arrangement of the printhead. The image data transfer rate of the host computer can be increased, and the inkjet printing apparatus can be provided at low cost.

Division of the print buffer area in the scanning direction as described above is effective when all image data to be printed by one scanning cannot be stored due to a small print buffer size. For example, even when only image data of the first to sixth blocks can be stored, in other words, data of the seventh and eighth blocks cannot be stored, data of the first block is printed by scanning the printhead, and then data of the seventh block is stored in an area where the data of the first block has been stored. Data of the second block is printed, and then data of the eighth block is stored in an area where the data of the second block has been stored. As a result, data of the first to eighth blocks can be stored in the print buffer, and all the block data can be printed.

A printer driver which generates image data to be output from the host computer to the printing apparatus will be briefly explained.

As described with reference to FIG. 6, the printing area by one scanning on the printing medium is divided into eight in the scanning direction, and eight block data corresponding to the divided regions are generated. Data are sequentially output from the first block data to the printer in correspondence with a direction in which the printhead is scanned. Each block data can generate color data in accordance with the number of colors of the printhead mounted on the printing apparatus. Only color data necessary for printing is generated for each block.

As shown in FIG. 5A, block data follows the command, data length, and setting data. The setting data contains information on the block size and the like.

As shown in FIG. 5B, a color change code is interposed between color data. The color data contains compressed raster data and its compression TAG.

In the above embodiments, droplets discharged from the printhead are ink, and a liquid contained in the ink tank is ink. The content of the ink tank is not limited to ink. For example, the ink tank may contain a processing solution to be discharged onto a printing medium in order to increase the fixing properties, water resistance, or image quality of a printed image.

Of inkjet printing systems, the embodiments can adopt a system which comprises a means (e.g., an electrothermal transducer or laser beam) for generating heat energy as energy utilized to discharge ink and changes the ink state by heat energy. This inkjet printing system can increase the printing density and resolution.

As a representative arrangement or principle, the present invention preferably adopts the basic principle disclosed in, by way of example, U.S. Pat. Nos. 4,723,129 or 4,740,796. This system is applicable to both a so-called on-demand apparatus and continuous apparatus. The system is particularly effective for the on-demand apparatus because of the following reason. That is, at least one driving signal which corresponds to printing information and gives a rapid temperature rise exceeding nuclear boiling is applied to an electrothermal transducer arranged in correspondence with a sheet or liquid channel holding a liquid (ink). This signal causes the electrothermal transducer to generate heat energy, and causes film boiling on the heat effecting surface of the printhead. Consequently, a bubble can be formed in the liquid (ink) in one-to-one correspondence with the driving signal.

Growth and shrinkage of the bubble discharge the liquid (ink) from an orifice, forming at least one droplet. The driving signal more preferably has a pulse shape because a bubble grows and shrinks instantaneously at an appropriate timing to discharge the liquid (ink) with high response.

A full line type printhead having a length corresponding to the width of the largest printing medium printable by the printing apparatus can take a structure which meets this length by a combination of printheads as disclosed in the above-mentioned specifications, or a single integrated printhead structure.

It is also possible to employ a cartridge type printhead described in the embodiments in which an ink tank is integrated with a printhead itself, or an interchangeable chip type printhead which can be electrically connected to an apparatus main body and receive ink from the apparatus main body when attached to the apparatus main body.

It is preferable to add a printhead recovery means or preliminary means to the printing apparatus because printing operation can stabilize further. Practical examples of the additional means are a capping means for the printhead, a cleaning means, a pressurizing or suction means, an electrothermal transducer, another heating element, and a preliminary heating means as a combination of the electrothermal transducer and heating element. A preliminary discharge mode which performs discharge unrelated to printing is also effective for stable printing.

The printing mode of the printing apparatus is not limited to a printing mode using only a main color such as black. The apparatus can adopt at least either a composite color mode using different colors or a full color mode using a color mixture, regardless of whether the printhead is an integral printhead or a combination of printheads.

The above embodiments assume that ink is a liquid. It is also possible to use ink which solidifies at room temperature or less and softens or liquefies at room temperature. The inkjet system generally executes temperature control such that the viscosity of ink falls within a stable discharge range by adjusting the temperature of ink within the range of 30° C. (inclusive) to 70° C. (inclusive). Ink suffices to liquefy when applied with a printing signal in use.

In addition, the printing apparatus according to the present invention may be integrally or separately arranged as an image output terminal for an information processing device such as a computer. The printing apparatus may also take the form of a copying apparatus combined with a reader or the like, or a facsimile apparatus having a transmission/reception function.

As described above, the above embodiments can increase the transfer rate of image data from the host computer to the printing apparatus.

As many apparently widely different embodiments of the present invention can be'made without departing from the spirit and scope thereof, it is to be understood that the invention is not limited to the specific embodiments thereof except as defined in the appended claims.

What is claimed is:

1. A printing apparatus comprising:
   a print head movable with respect to a sheet, the print head having a plurality of nozzle arrays;
   a print buffer configured to store image data for printing with the print head, the print buffer having a plurality of regions each including sub-regions corresponding to each of the plurality of nozzle arrays;
   a first unit configured to receive sequentially a plurality of block data from a host device, each block data containing plurality sets of compressed data corresponding to one nozzle array and a color change code representing an end of the corresponding compressed data, the first unit forming decompressed data from the compressed data and converting the decompressed data from a raster format into a column format to form the image data, wherein the first unit generates a signal when the color change code is detected; and
   a second unit configured to control storage of the image data formed from one of the block data to one of the regions in the print buffer, the second unit changing the sub-region where the image data is to be stored in response to generation of the signal.

2. The printing apparatus according to claim 1, wherein the second unit changes the region where image data is to be stored when storage of image data corresponding to the one block data is completed.

3. The printing apparatus according to claim 1, further comprising a processing unit configured to control printing operations of the printing apparatus, wherein the first unit generates a control signal when decompression of the one block data is completed, and the processing unit performs the printing operations based on the control signal.

4. The printing apparatus according to claim 1, further comprising a third unit configured to generate signals for driving the print head from the image data stored in the print buffer.

5. The printing apparatus according to claim 1, wherein the image data includes data corresponding to a plurality of colors and each of the plurality of colors corresponds to at least one of the plurality of nozzle arrays.

6. The printing apparatus according to claim 1, wherein the host device comprises a dividing unit configured to divide a plurality of raster data into a plurality of raster data blocks in a scan direction of the print head and a compressing unit configured to compress each of raster data blocks to generate the compressed data.

7. The printing apparatus according to claim 1, wherein the print head comprises an inkjet head.

8. A printing apparatus comprising:
   a print head movable with respect to a sheet;
   a print buffer configured to store image data for printing with the print head, the print buffer having a plurality of regions each including sub-regions corresponding to each of a plurality of colors;
   a first unit configured to receive sequentially a plurality of block data from a host device, each block data containing plurality sets of compressed data corresponding to one color and a color change code representing an end of the corresponding compressed data, the first unit forming decompressed data from the compressed data and converting the decompressed data from a raster format into a column format to form the image data, wherein the first unit generates a signal when the color change code is detected; and
   a second unit configured to control storage of the image data formed from one of the block data to one of the regions in the print buffer, the second unit changing the sub-region where the image data is to be stored in response to generation of the signal.

9. The printing apparatus according to claim 8, wherein the second unit changes the region where image data is to be stored when storage of image data corresponding to the one block data is completed.

10. The printing apparatus according to claim 8, further comprising a processing unit configured to control printing operations of the printing apparatus, wherein the first unit generates a control signal when decompression of the one block data is completed, and the processing unit performs the printing operations based on the control signal.

11. The printing apparatus according to claim 8, further comprising a third unit configured to generate signals for driving the print head from the image data stored in the print buffer.

12. The printing apparatus according to claim 8, wherein the print head has a plurality of nozzle arrays, and the image data includes data corresponding to a plurality of colors and each of the plurality of colors corresponds to at least one of the plurality of nozzle arrays.

13. The printing apparatus according to claim 8, wherein the host device comprises a dividing unit configured to divide a plurality of raster data into a plurality of raster data blocks in a scan direction of the print head and a compressing unit configured to compress each of raster data blocks to generate the compressed data.

14. The printing apparatus according to claim 8, wherein the print head comprises an inkjet head.

* * * * *